(12) United States Patent
Margalith

(10) Patent No.: US 9,170,470 B1
(45) Date of Patent: Oct. 27, 2015

(54) NON-PLANER, IMAGE ROTATING OPTICAL PARAMETRIC OSCILLATOR

(71) Applicant: Eli Margalith, Solana Beach, CA (US)

(72) Inventor: Eli Margalith, Solana Beach, CA (US)

( * ) Notice: Subject to any disclaimer, the term of this patent is extended or adjusted under 35 U.S.C. 154(b) by 0 days.

(21) Appl. No.: 14/121,438

(22) Filed: Sep. 6, 2014

(51) Int. Cl.
  *G02F 1/39* (2006.01)
  *H01S 3/00* (2006.01)
  *H01S 3/16* (2006.01)

(52) U.S. Cl.
  CPC ............... *G02F 1/39* (2013.01); *H01S 3/0092* (2013.01); *H01S 3/1643* (2013.01)

(58) Field of Classification Search
  CPC combination set(s) only.
  See application file for complete search history.

(56) References Cited

U.S. PATENT DOCUMENTS

| 6,421,166 B1 * | 7/2002 | Velsko et al. | 359/330 |
| 2010/0296153 A1 * | 11/2010 | Jungbluth et al. | 359/328 |

* cited by examiner

*Primary Examiner* — Hemang Sanghavi
(74) *Attorney, Agent, or Firm* — John R. Ross, III; John R. Ross

(57) ABSTRACT

An Optical Parametric Oscillator (OPO) that includes optical elements located and oriented to form a non-planer, image-rotating ring cavity. To provide a high quality well shaped output beam, the OPO comprises a plurality of reflecting surfaces, designed to rotate the resonating beam by 90 degrees for each round trip in the cavity. Preferred embodiments include a first non-linear crystals and a similar second non-linear crystal mounted side-by-side on a single rotating stage. To minimize the adverse effects of walk-off, reflecting unit is positioned to cause the output of the first crystal to be reflected into the second crystal. The two crystals are aligned so as to cause walk-off in the first of the two crystals to be cancelled by opposite walk-off in the second crystal.

17 Claims, 3 Drawing Sheets

NON-PLANER, IMAGE ROTATING OPTICAL PARAMETRIC OSCILLATOR

CROSS REFERENCE TO RELATED APPLICATIONS

This Application claims the benefit of U.S. Provisional Patent Application, Ser. No. 61/997,742, filed Jun. 7, 2014.

FIELD OF THE INVENTION

The present invention relates to the general art of non-linear optical frequency conversion systems, and in particular to such systems designed for improved beam quality, high conversion efficiency and high power.

BACKGROUND OF THE INVENTION

Optical Parametric Oscillators

An Optical Parametric Oscillator (OPO) is a device employing one or more non-linear crystals which when pumped by a laser beam defining a pump wavelength, can generate coherent light at two different and longer wavelengths. The operation of an OPO typically requires a very high light intensity in the pump beam which is generally supplied by a very short pulse laser. In the OPO at least one non-linear crystal (such as $BaB_2O_4$, $LiB_3O_5$, $LiNbO_3$, $KTiOPO_4$ and others) is placed in an optical resonator. When the pump laser beam is directed to propagate through the crystal, a pair of beams (referred to as the signal beam and the idler beam) is produced. Energy of the photons in the beams is conserved so:

$$\frac{1}{\lambda_p} = \frac{1}{\lambda_s} + \frac{1}{\lambda_i}$$

where $\lambda_p$ refers to the wavelength of the pump beam, $\lambda_s$ refers to the wavelength of the signal beam and $\lambda_i$ refers to the wavelength of the idler beam. Typically the shorter wavelength beam is referred to as the signal beam and the longer wavelength beam is referred to as the idler beam. The generation of the parametric beams (the idler and the signal) in a single path through the crystal(s) is inefficient and only a small fraction of the pump beam is converted. In order to construct an efficient and useful device the crystal(s) are typically placed inside a resonator that is designed to oscillate one or both of the parametric beams inside the cavity, such that it (or they) are amplified in successive passes through the crystal(s). The oscillator components of the OPO are typically comprised of optical elements designed to provide the required feedback for efficient conversion. The principles of OPO are well known and described in many publications on lasers and non-linear optics (for example, A. Yariv, Quantum Electronics, 3$^{rd}$ edition, p. 411. John Wiley & Sons, New York). In many of these OPO's the wavelengths of the signal beam and therefore the idler beam can be tuned over a wide spectral range by varying the orientation of the crystal with respect to the laser beam, by changing the crystal's temperature, or by applying a variable voltage across the crystal. Various tuning ranges can be achieved by properly selecting the laser, the non-linear crystal, and the optical components.

Optical parametric oscillators (OPO's) have been recognized as critical devices for a wide range of applications. In the early stages they were used primarily for research applications and as the designs of these devices have improved they have been incorporated in instruments that are used in commercial applications, (e.g., medical Imaging and hyperspectral Imaging). The transition from research to commercial applications present more stringent design constrains, and critical demands such as high reliability, high damage threshold, robust and compact designs. Although there have been significant advances in the design of OPO devices since they were first invented, a device that will meet all of these criteria is still needed.

Efficiency & Damage Threshold

The optical parametric process requires that the signal and idler beams propagate approximately along the same direction as the pump beam. In simple OPO designs the pump beam traverses the crystal only in one direction whereas the parametric beam oscillates back and forth. In this case the interaction between the pump and the parametric beams is limited to only half the time the parametric photons are oscillating inside the cavity, resulting in low conversion efficiency. To maximize efficiency, OPO's have been designed such that the pump beam as well as the parametric beams transverse the crystal in the same direction. For example, the pump beam can be reflected back through the crystal along the same path but in the opposite direction to create what is known as a double path oscillator. (See, for example, Brosnan, Optical Parametric Oscillator Threshold and Linewidth Studies. IEEE JQE Vol. 15, No 6, June 1979; Guyer, U.S. Pat. No. 5,079,445; Nabor, U.S. Pat. No. 5,781,571, and Zhang, U.S. Pat. No. 6,295,160). However, in a double path the pump intensity inside the crystals (and some of the optics) is very high and may result in damage.

This issue can be resolved in a ring oscillator design in which the pump beam and the OPO beams propagate in the same direction, in a closed loop ring (Margalith, U.S. Pat. No. 5,276,548, incorporated herein by reference). This design results in very high conversion efficiency while operating at about twice the damage threshold of linear double path cavities (i.e. permitting pumping at twice the intensity without optical damage). This design is also very robust and relatively insensitive to minor misalignments of the cavity.

Beam Quality

Early OPO designs demonstrated poor beam quality, which was expressed by high divergence, typically on the order of 10 mRad, and non-symmetrical beam profiles. The main reason for the poor beam quality was the high Fresnel numbers of these oscillators. Fresnel number is expressed by $$F = \frac{D^2}{\lambda L}$$

where D is the pump beam diameter, λ the resonated wavelength, and L the round-trip length of the cavity. The beam diameter is relatively large to minimize risk to damage whereas the cavity length is kept to a minimum to maximize the number of round trips in the cavity. In substantially all conventional OPO cavity designs, increasing the ratio of beam diameter to cavity length reduces the beam quality. There are two methods to improve the beam quality of a short oscillator with relatively large beam diameters:

One method is to use a confocal unstable resonator in which light originally oscillating near the cavity axis gradually spreads over the entire beam diameter by diffraction and magnification. This design is limited to a single pass through the crystals and therefore the efficiency of such an OPO is very low.

Another method is to design an image rotation resonator in which the OPO beam rotates by 90 deg in each round trip in the cavity. This technique is covered in details by Arlee V. Smith and Mark S. Bowers in "Image-rotating cavity designs for improved beam quality in nanosecond optical parametric oscillators" J. Opt. Soc. Am. B/Vol. 18, No. 5/May 2001, P. 706. The paper provides in-depth analysis of Image rotating oscillators and offers a number of designs of such oscillators. These designs have all been studied through simulations. Most of the proposed oscillators have not been reduced to practice and, to Applicant's knowledge, the ones that have been reduced to practice have utilized a linear double path design, which increases the risk for damage. A true image-rotating ring oscillator is presented in U.S. Pat. No. 6,775, 054 (Smith et al 2004, incorporated herein by reference). This prior art patent presents an oscillator which incorporates 4 mirrors and a waveplate that rotates the image of the signal beam in each round trip while maintaining the polarizations as required. The 4 mirrors were all arranged at a precise 32.8 degrees angle of incidence. The objective of this invention was to obtain high efficiency as well as good beam quality. However, in order to achieve these objectives, the cavity design imposes constrains which limit its practicality. The device operates at a high efficiency, but it is most suitable as a single wavelength OPO as it is difficult to design one that will generate a wide range of wavelengths, as desired by most applications. The inventors in that patent show a design in which the two crystals are placed in series in the same path to increase the gain and minimize the walk off. With this arrangement tuning would be very difficult requiring two separate tuning mechanisms. Tuning issues are not dealt with in the patent. For these reasons very few devices of this design have been introduced to the market.

Walk-Off Issues

As explained in U.S. Pat. No. 5,276,548 granted to Applicant, in critical phase matching configurations walk-off (which results as beams of different polarizations propagate through a birefringent crystals) can severely limit the effective gain in OPO devices. This patent is hereby incorporated herein by reference. This problem can be eliminated by arrangements that pass the beams twice through the same crystal so the walk-off on the second pass cancels the walk-off on the first pass. The same result can be achieved by causing the beams to pass through two identical crystals properly aligned so that the walk-off in one crystal cancels the walk-off in the other crystal.

Other Issues

The performance of an OPO is characterized by various parameters such as wavelength tuning range, conversion efficiency, high damage threshold, spectral line width, and beam quality. Other attributes such as low cost, long-term stability, robust design and ease of operation are important in making the OPO a practical device. For a given pump beam, the design of the oscillator dictates the performance of the OPO. Various constraints affect the design, and therefore the performance of presently available OPO devices.

What is needed is an OPO that not only meets the objectives discussed above, but also enables wide wavelength tunability, a simple low-cost, reliable, easily operated means to orient two crystals in the cavity while maintaining phase matching, high conversion efficiency, high damage threshold and good beam quality.

SUMMARY OF THE INVENTION

The present invention provides optical parametric oscillator for converting, with one or more nonlinear crystal, a laser pump beam into a signal beam and an idler beams, The pump beam is injected into a non-planer ring resonance cavity using a mirror that is designed to reflect the pump beam while transmitting the OPO beams. The cavity includes a nonlinear crystal unit pivotally positioned within the cavity so as to receive the pump beam and to convert energy of the pump beam into the signal and idler beams with both signal and idler beams propagating in directions common to the pump beam. The cavity also includes a number of reflecting elements together providing at least seven reflecting surfaces. At least five of the reflecting elements are oriented to rotate one or both OPO beams by 90 degrees on each pass of the OPO beam or beams through the cavity. At least two of the reflecting surfaces are oriented to receive the pump beam and the OPO beams after each first pass through a first portion of the nonlinear crystal unit and to reflect the pump beam and the OPO beams so as to cause the beams to pass a second time through a second portion of the nonlinear crystal unit in order to cancel, on the second pass, walk-off produced by the first pass. In preferred embodiments the cavity also includes a polarization correcting element positioned within the cavity and adapted to rotate the polarization of the one or both rotated beams back to its or their un-rotated polarization on each pass, through the cavity. In these preferred embodiments the wavelengths of the signal and idler beams are dependent of the pivot position of the nonlinear crystal unit and the wavelengths of the signal and/or the idler beams are controlled by the pivoting of the nonlinear crystal unit.

The nonlinear crystal unit may be a single crystal or two crystals mounted together as a unit and rotated in order to generate different wavelengths in the OPO. The two reflecting surfaces, oriented to receive the pump beam and the OPO beams after each first pass through a first portion of the nonlinear crystal unit and to reflect the pump beam and the OPO beams so as to pass through a second portion of the nonlinear crystal unit in order to cancel, on the second pass, walk-off produced by the first pass may be two surfaces of a prism, such as a roof prism or two mirrors. In preferred embodiments, the crystal unit is adapted for type II OPO operation. The oscillator may be operated to oscillate the signal beam or it may be operated to oscillate the idler beam or both. In a prototype unit built and operated by the Applicant the polarization correcting element is an achromatic half waveplate and the pump beam is a third harmonic 355 nanometer beam produced by a 1064 nanometer Q-switched Nd-YAG laser. The pump beam could also be the second harmonic 532 nanometer beam produced by the Q-switched Nd-YAG laser, or the fundamental wavelength of the Nd:YAG laser at 1064 nm. The pump laser is not limited to Nd:YAG laser and any laser that meets the criteria required to pump an OPO, and its harmonics, can serve as the pump. To increase the efficiency of the oscillator, one or more nonlinear crystals may be placed outside the OPO cavity in the output beam to amplify the OPO energy.

This invention provides an OPO with unique attributes: wide wavelength tunability, a simple low-cost, reliable, easily operated means to orient the nonlinear crystal unit in the cavity while maintaining phase matching, high conversion efficiency while maintaining high damage threshold and good beam quality. This design is easy to fabricate and therefore makes OPO's of the present invention practical for a wide range of applications. In preferred embodiments, including Applicant's prototype, the OPO utilizes a non-planer ring-cavity design which rotates the signal beam image 90 degrees on each round trip. The polarization of the signal beam however is controlled so that, ahead of each pass through the non-linear crystals, the polarization of the beam is rotated back to its original orientation. In the prototype embodiment the ring cavity includes seven reflective surfaces including five mirrors, a roof prism (also known as a right angle prism). In addition a dichotic mirror is placed inside the ring cavity to introduce the pump beam into the cavity. A half wave plate corrects the polarization of the oscillating OPO beam. The prototype device includes a first non-linear crystal and a similar second non-linear crystal mounted side-by-side on a single rotating stage. The roof prism is positioned to cause the beam exiting the first crystal to be reflected into the second crystal and the two crystals are aligned so as to cause walk-off in the first of the two crystals to be cancelled by opposite walk-off in the second crystal. This OPO is designed to provide a high-energy output beam with excellent beam quality without damage to the OPO optics. In one form of the invention, the optical elements include a right angle prism to reflect the beam exiting the first crystal into the second crystal, two non-linear crystals, an output coupling mirror and 4 mirrors to reflect the signal beam in a closed ring. The seven reflecting surfaces are two back surfaces of the prism, the output coupler, and the four mirrors designed to rotate the resonating signal beam. In other preferred embodiments the oscillator could be designed to resonate the idler beam in which case the idler beam would be rotated. Rotation of the resonating beam greatly improves the quality of the output beam.

Applicant has constructed a prototype OPO that was pumped at 355 nm and generated very good beam quality, and with this prototype he has proven that oscillators designed in accordance with the present invention can operate over the entire visible spectrum and into the infrared region (410 nm to 2400 nm). The OPO can be designed to generate other wavelengths based on the choice of crystals and the pump laser.

DETAILED DESCRIPTION OF PREFERRED EMBODIMENT

The following is a description of an OPO in which the signal beam is resonating: (The same resonator can be designed to oscillate the idler beam by selecting a different output coupler and exchanging the term signal with the term idler.)

Figure 2:
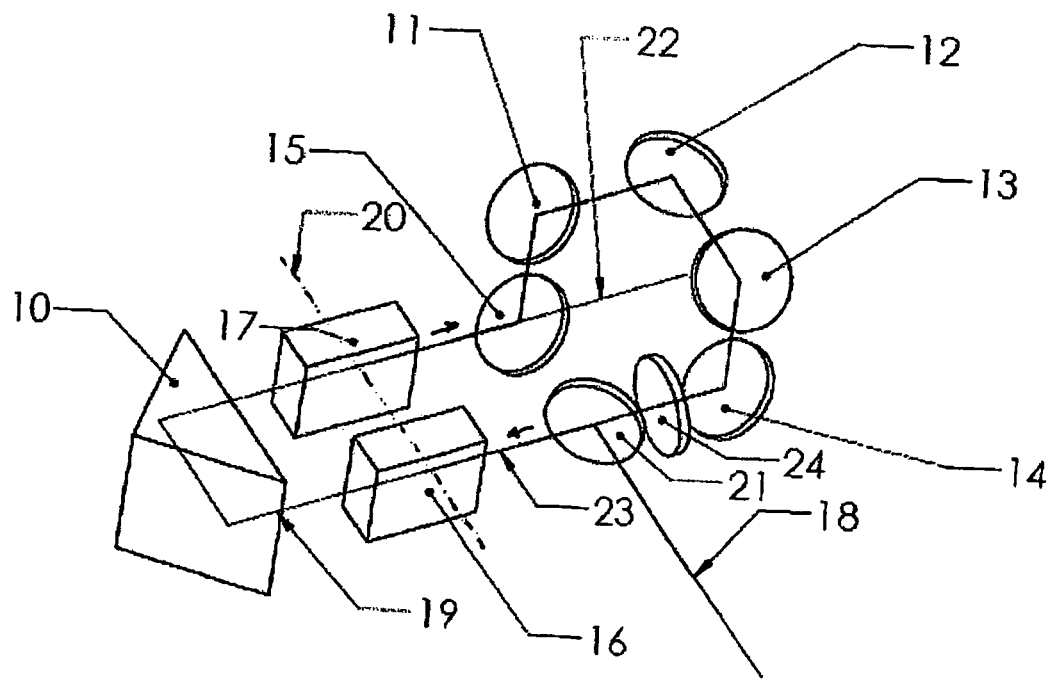
FIG. 2 shows a preferred embodiment of the present invention.

The oscillator presented in FIG. 2 is formed by seven reflective surfaces. A roof prism (10), which provides two reflective surfaces, four mirrors (11,12,13,14) that are designed to reflect the signal beam, and mirror 15 with a dielectric coating designed to partially transmit the signal beam while maximizing the transmission of the idler beam and the pump beam. The pump beam 18 is introduced into the cavity by a mirror 21 that is designed to reflect the pump beam and transmit the signal and the idler beams. This mirror is not a part of the oscillator and serves only to inject the pump beam into the cavity. The cavity incorporates two non-linear crystals 16 and 17 that are mounted side by side on a rotation stage such that the walk-off in crystal 16 is cancelled by walk-off in crystal 17 in each round trip. The two crystals are rotated together around a common axis 20. In the preferred embodiment the crystals are cut for a type II OPO operation.

The pump beam 18 introduced into the cavity by reflection off mirror 21 transverses through crystal 16 and is turned around by 180 degrees by two total internal reflections inside the roof prism 10, then the pump beam, along with signal and idler components, pass through crystal 17. The two crystals are substantially identical, phase matched and positioned such that walk-off of the beams generated in the second crystal cancels the walk-off generated in the first crystal. The residual pump beam is almost entirely rejected from the cavity by passing through mirror 15, so nearly all of the pump beam passes only once through each crystal. This is an important factor controlling the pump energy below the damage thresholds of the crystals and other optical elements in the cavity. The OPO beams are generated in the crystals, propagate in the same direction and are collinear with the pump beam (in the directions marked by the arrows) between mirrors 21 and mirror 15.

The signal and idler beams and the pump beam are reflected by prism 10 (total internal reflection, independent of wavelength). A fraction of the oscillating signal beam is reflected back into the cavity, toward mirror 11 by the partial reflector 15 (that serves as the output coupler) whereas the majority of the signal beam as well as substantially all of the entire idler beam and the pump beam are transmitted through it. The residual pump beam is separated from the OPO by a mirror placed outside the OPO (not shown). Most of the signal beam, almost all of the idler beam are the output of the OPO as shown at 22. The idler beam may be separated from the signal beam with a polarizer or with one or more dichroic mirrors. The portion of the signal beam that has been reflected by mirror 15 is deflected upwards 90 degrees in a direction approximately perpendicular to the plane formed by the pump beam (see 25 in FIG. 1). It is then reflected 90 degrees by mirror 11 in a direction parallel to beam 22, then reflected 90 degrees by mirror 12 in a direction parallel to the plane of the pump beam to mirror 13 where it is reflected 90 degrees downward to mirror 14 which reflects the signal beam 90 degrees in a direction aligned with bump beam 23.

Figure 3:
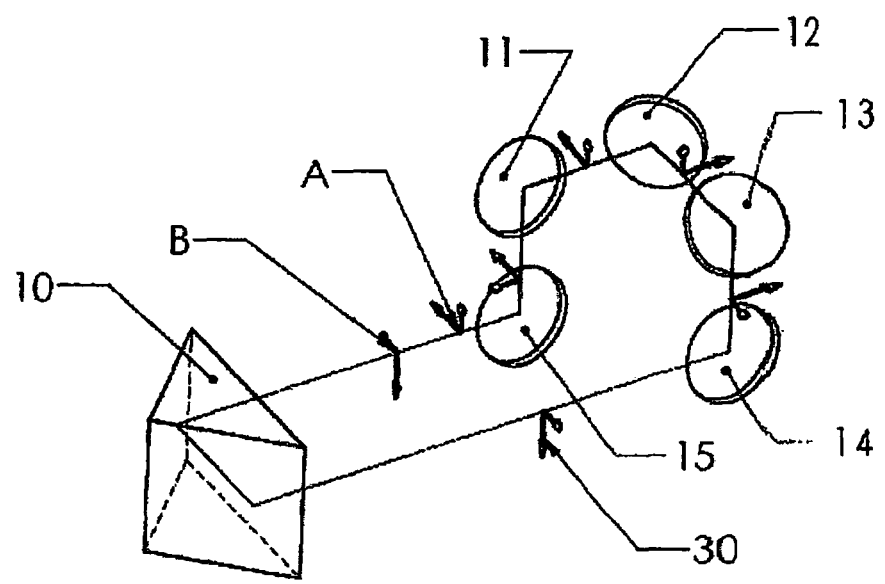
FIG. 3 shows how five mirrors and a roof prism are used in the preferred embodiment to rotate the image of the signal beam 90 degrees on each pass through a pair of non-linear crystal.

As shown in FIG. 3, the symbol 30 represents the cross section image of the signal beam. The non-planar oscillator rotates the oscillating signal beam by 90 degrees each round trip. The beam rotation can be visualized by following the change of orientation of the symbol as the beam is reflected by the oscillator optics. Starting in position A and propagating clockwise, the beam rotates by 90 degrees after completing the round trip in position B. The polarization of the signal beam is also rotated 90 degrees together with its image, but it is rotated back by 90 degrees on each pass as the beam propagates in the cavity. This is accomplished with an achromatic half waveplate 24 (see FIG. 2).

Figure 1:
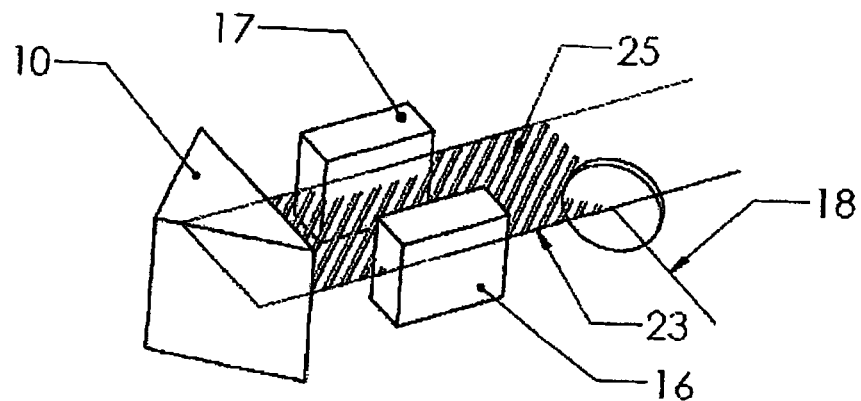
FIG. 1 shows the beam path through a portion of the cavity of a preferred embodiment.

The pump beam 18 is propagating in a plane 25 as shown in FIG. 1. It is linearly polarized perpendicularly to the plane. The pump beams passes once through each crystal 16 and 17 and exit the cavity 22. It maintains the polarization and its image orientation as it traverses the cavity between optics 21 and 15. The two crystals are mounted side-by-side and are rotated together around a common axis (20). They can be rotated for wavelength tuning by a single mechanism while maintaining the phase matching between them. This configuration allows the use of two crystals without a need for two motors or a gear. In applicants prototype embodiment the crystals are rotated about 40 degrees to scan the signal beam from about 410 nm to about 2400 nm.

This non-planar ring cavity presented in this invention has all the advantages presented by the ring oscillator of U.S. Pat. No. 5,276,548, with the addition of an image rotation feature. This OPO is not much larger than the planer ring design and therefore, the number of round trips in the cavity will be similar when pumped by a laser with the same pulse length. This design results in very good beam quality, low divergence, high conversion efficiency, and high damage threshold OPO. In addition the OPO provides wide wavelength tunability, a simple, low-cost, reliable, easily operated mechanism to orient the two crystals while maintaining phase matching.

Variations

Figure 4:
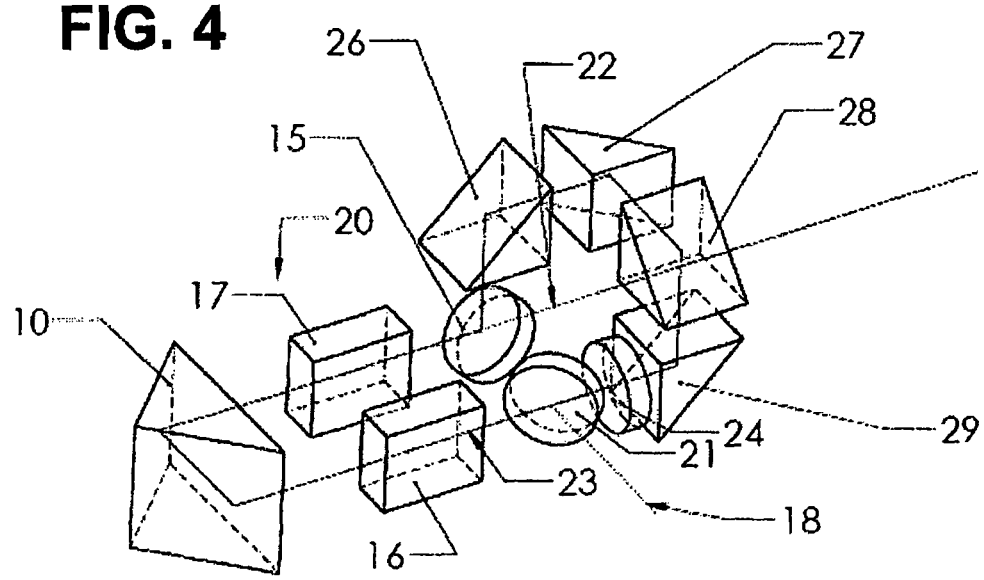
FIG. 4 shows a design similar to the design shown in FIG. 3 with some of the mirrors replaced by prisms.
Figure 5:
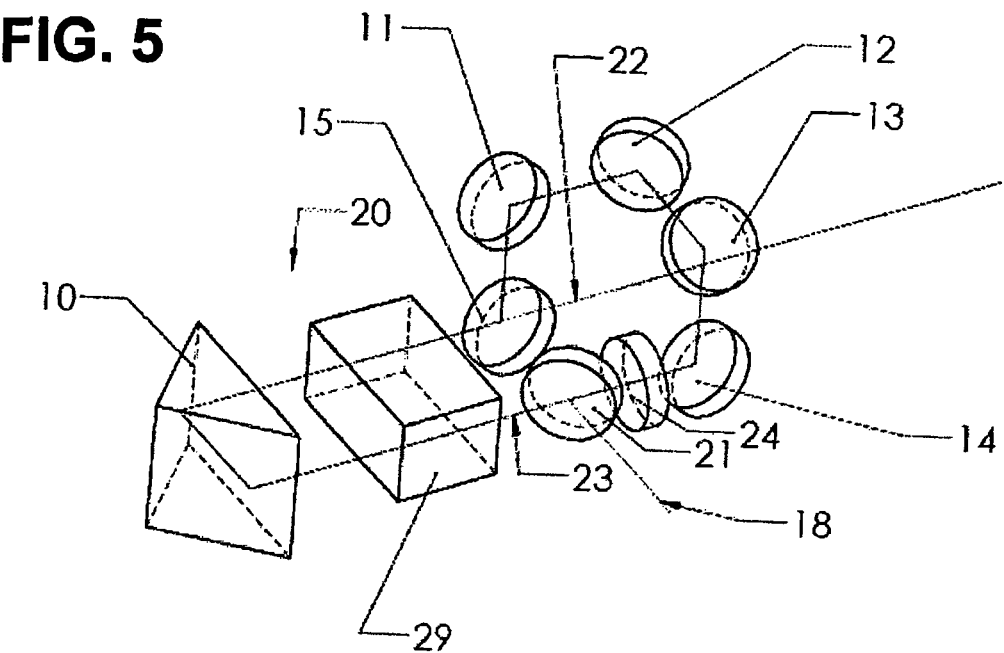
FIGS. 5 and 6 show additions and variations to the embodiment shown in FIGS. 1 through 4.
Figure 6:
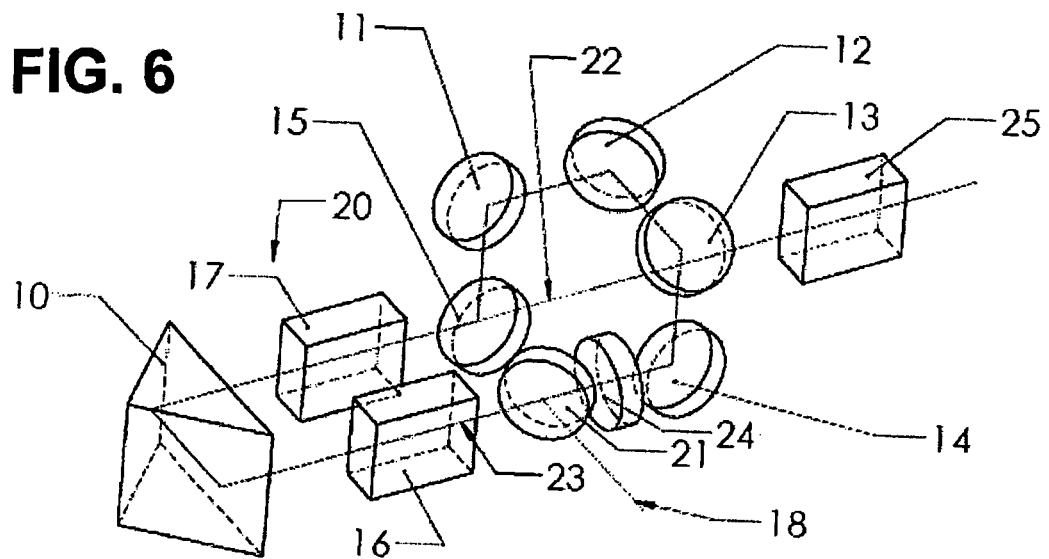

Persons skilled in this art will recognize that many variation of and additions to the specific design described in detail above are possible utilizing the novel concepts of the present invention. For example as shown in FIG. 4 mirrors 11, 12, 13, and 14 could be replaced by roof prisms arranged to provide 90 degree reflections which provide almost total internal reflection. Also the two substantially identical non-linear crystals as shown in FIG. 2, could be replaced by a single larger crystal as shown in FIG. 5. Applicant prefers to use the two smaller crystals because two smaller crystals are typically less expensive than one larger crystal required for the same OPO task. Another variation would be to add one or more crystals, 25 outside the cavity to serve as an amplifier as shown in FIG. 6. At this position in the signal beam will be further amplified by extracting additional energy from the collinear pump beam. Applicant estimates that this addition will increase the efficiency of the system from about 30 percent to about 50 percent. OPO systems of the present invention could also include optical components to separate the three frequencies in output beam 22. Alternatively this task may be left to the user of the OPO. Additional variations that are described in Applicants U.S. Pat. No. 5,276,548 (which has been incorporated herein) could also be utilized in OPO systems of the present invention.

Therefore the scope of the present invention should be determined by the appended claims and not by the examples that have been given.

What is claimed is:

1. An optical parametric oscillator for converting, with at least one nonlinear crystal, a laser pump beam into a signal beam and an idler beam, said signal and idler beams defining two OPO beams, said oscillator comprising:
   A) a non-planer ring resonance cavity comprising:
      1) a nonlinear crystal unit pivotally positioned within the cavity so as to receive the pump beam and to convert energy of the pump beam into the signal and idler beams with both signal and idler beams propagating in directions common to the pump beam;
      2) plurality of reflecting elements together providing at least seven reflecting surfaces, wherein:
         I) at least five of the reflecting elements are oriented to rotate one or both OPO beams by 90 degrees on each pass of the OPO beams through the cavity, and
         II) two of the reflecting surfaces are oriented to receive the pump beam and the OPO beams after each first pass through a first portion of the nonlinear crystal unit and to reflect the pump beam and the OPO beams so as to pass a second time through a second portion of the nonlinear crystal unit in order to cancel, on the second pass, walk-off produced by the first pass;
   B) a pump beam deflector positioned to deflect the pump beam into the resonance cavity;
   C) a polarization correcting element positioned within the cavity and adapted to rotate the polarization of the one or both rotated beams back to its or their un-rotated polarization on each pass, of the one or both rotated OPO beams, through the cavity;
wherein wavelengths of the signal and idler beams are dependent of the pivot position of the nonlinear crystal unit.

2. The optical parametric oscillator as in claim 1 wherein the nonlinear crystal unit is comprised of a single non-linear crystal.

3. The optical parametric oscillator as in claim 1 wherein the nonlinear crystal unit is comprised of two substantially similar non-linear crystals mounted together and adapted to pivot as a unit about a common axis.

4. The optical parametric oscillator as in claim 3 and further comprising a rotation stage adapted to pivot the two crystals about the common axis to adjust the wavelength of the rotated beam.

5. The optical parametric oscillator as in claim 2 and further comprising a rotation stage adapted to pivot the single nonlinear crystal about an axis to adjust the wavelength of the rotated beam.

6. The optical parametric oscillator as in claim 1 wherein the two reflecting surfaces, oriented to receive the pump beam and the OPO beams after each first pass through a first portion of the nonlinear crystal unit and to reflect the pump beam and the OPO beams so as to pass a second time through a second portion of the nonlinear crystal unit in order to cancel, on the second pass, walk-off produced by the first pass, are two surfaces of a prism.

7. The optical parametric oscillator as in claim 6 wherein the prism is a roof prism.

8. The optical parametric oscillator as in claim 1 wherein the two reflecting surfaces, oriented to receive the pump beam and the OPO beams after each first pass through a first portion of the nonlinear crystal unit and to reflect the pump beam and the OPO beams so as to pass a second time through a second portion of the nonlinear crystal unit in order to cancel, on the second pass, walk-off produced by the first pass, are two mirrors.

9. The optical parametric oscillator as in claim 1 wherein the crystal unit is adapted for type II OPO operation.

10. The optical parametric oscillator as in claim 1 wherein the oscillator is adapted for i oscillation of the signal beam.

11. The optical parametric oscillator as in claim 1 wherein the oscillator is adapted for oscillation of the idler beam.

12. The optical parametric oscillator as in claim 1 wherein the polarization correcting element is an achromatic half waveplate.

13. The optical parametric oscillator as in claim 1 wherein the pump beam is a 1064 nanometer laser beam produced by a Q-switched Nd-YAG laser.

14. The optical parametric oscillator as in claim 1 wherein the pump beam source is a second harmonic 532 nanometer laser beam produced by a Q-switched Nd-YAG laser.

15. The optical parametric oscillator as in claim 1 wherein the pump beam source is a third harmonic 355 nanometer laser beam produced by a Q-switched Nd-YAG laser.

16. The optical parametric oscillator as in claim 11 wherein the at least four of the at least seven reflecting surfaces are surfaces of mirrors.

17. The optical parametric oscillator as in claim 11 where at least one crystal is placed outside the OPO cavity to amplify the OPO energy.

\* \* \* \* \*